J. C. HUDSON.
WHEEL AND SHAFT.
APPLICATION FILED OCT. 11, 1920.
1,392,501.
Patented Oct. 4, 1921.
2 SHEETS—SHEET 1.
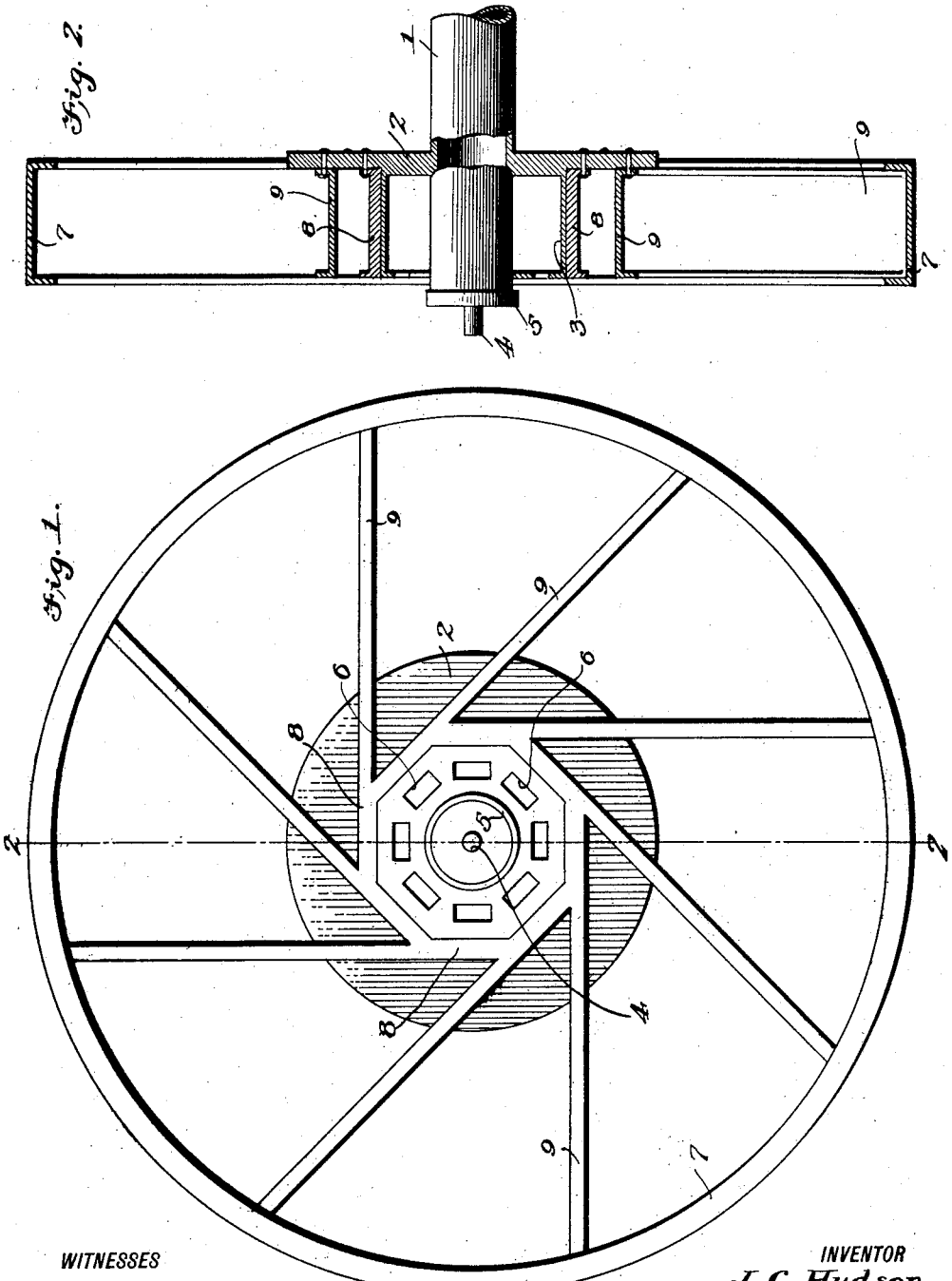
WITNESSES
INVENTOR
J. C. Hudson,
BY
ATTORNEYS

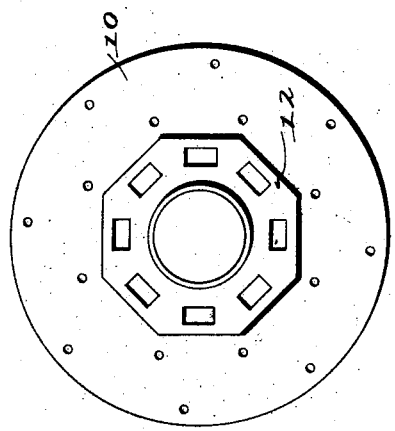
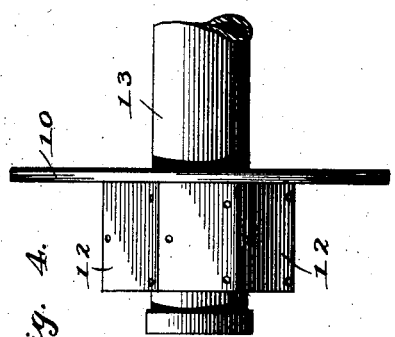
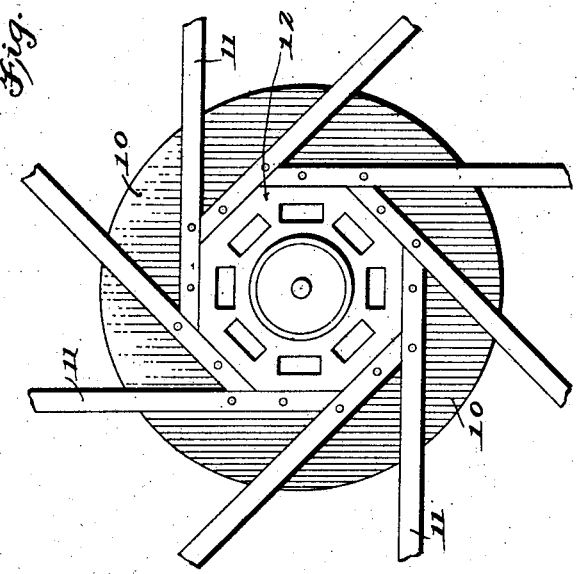
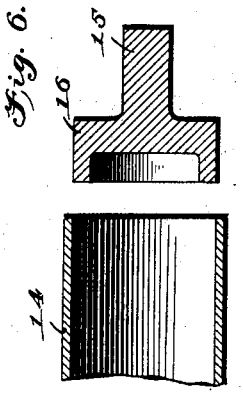

UNITED STATES PATENT OFFICE.

JAMES CONDRON HUDSON, OF GORMAN, TEXAS.

WHEEL AND SHAFT.

1,392,501.  Specification of Letters Patent.  Patented Oct. 4, 1921.

Application filed October 11, 1920. Serial No. 416,261.

*To all whom it may concern:*

Be it known that I, JAMES CONDRON HUDSON, a citizen of the United States, and a resident of Gorman, in the county of Eastland and State of Texas, have invented certain new and useful Improvements in Wheels and Shafts, of which the following is a specification.

My invention is an improvement in wheels and shafts, and has for its object to provide a wheel and shaft of the character known as bull and calf wheels used in drilling oil and gas wells, wherein the shaft is provided near each end with a hub or polygonal cross section, and wherein the wheel body consisting of a hub portion, a rim and connecting spokes has the hub portion shaped to fit upon the polygonal hub of the shaft, the parts being secured together to provide a rigid structure.

In the drawings:—

Figure 1 is a face view of the improved wheel and shaft,

Fig. 2 is a section on the line 2—2 of Fig. 1,

Fig. 3 is an end view of the shaft,

Fig. 4 is a plan view of one end of the shaft,

Fig. 5 is a partial face view showing a part of the wheel in place,

Fig. 6 is a partial longitudinal section of the shaft showing another embodiment of the invention.

In the embodiment of the invention there is provided a tubular steel shaft 1, having at each end a radial flange 2, which carries a hollow hub portion 3 of greater diameter than the shaft, and of less diameter than the flange. The shaft extends through the hub portion 3 as shown, and a gudgeon 4 of cast iron, is arranged at each end of the shaft, each gudgeon having a cup shaped extension 5 which fits about the end of the shaft, as shown in Fig. 2. The hub portions 3 at the ends of the shaft are polygonal, that is they have polygonal peripheries, octagonal in the present instance, and the outer face or web of the hub portion is provided with slots or hand holes 6 as shown, the hand holes extending in an annular series coaxial with the gudgeon.

The wheel comprises a rim 7, a hub 8 and spokes 9 connecting the hub and the rim, and the said wheel is of integral metal in the present instance as for instance steel or cast iron, but it is obvious that the improved wheel might be formed from wood, so far as concerns the spokes. The hub portion 8 has a polygonal bore, for receiving the polygonal hub portion of the shaft, and referring to Fig. 2 it will be seen that this hub portion 8 is riveted to the flange 2. Referring to Figs. 1 and 2 it will be seen, the spokes 9 are tangential to the hub 8, and they are as is also the hub of channel formation, having the channels facing outwardly. The side walls of the channels are riveted to the flange 2, as clearly shown in Fig. 2 and the hub 8 may also be riveted to the hub 3 of the shaft. The rim 7 of the wheel has openings for receiving rivets, to permit the rims at the ends of the shaft to be connected by planking to complete the wheel, and when wooden spokes are used, they will be bolted or riveted to the hub.

In the embodiment of the invention shown in Figs. 3 to 5, the flange 10 of the shaft 13 corresponds to the flange 2 of Fig. 2, and to the flange 10 the spokes 12 are riveted. The construction is otherwise the same.

In Fig. 6 the shaft 14 has at each end a gudgeon 15. Each of these gudgeons has a cup shaped extension 16 which fits within the end of the shaft, and in both constructions the cup shaped extension may be bolted or riveted to the shaft to prevent disengagement thereof.

I claim:—

1. In combination with a cylindrical hollow shaft having adjacent each end an integral radial flange, and a hollow hub extending outwardly from said flange, said hub having a polygonal perimeter and a front wall provided with handholes, of a wheel body comprising a hub, spokes and rim, the spokes and hub being integral and channel-shaped, the second hub having a polygonal bore to fit the perimeter of the first named hub, the inner flange of the channel spokes and second hub rigidly secured to the aforesaid radial flange, and replaceable gudgeons secured at each end of the hollow shaft.

2. In combination with a cylindrical hollow shaft having adjacent each end an integral radial flange and a hollow integral polygonal hub extending beyond the flange and having a front wall provided with handholes, a wheel body comprising a rim, a hub and spokes connecting the rim and hub, said last named hub having a polygonal bore to fit about the polygonal hub of the shaft, said last named hub and spokes being integral, and means for connection between said integral hub and spokes of the wheel to the flange of the shaft.

JAMES CONDRON HUDSON.